No. 613,663. Patented Nov. 8, 1898.
F. E. CASE.
CONNECTOR.
(Application filed Aug. 5, 1898.)
(No Model.)
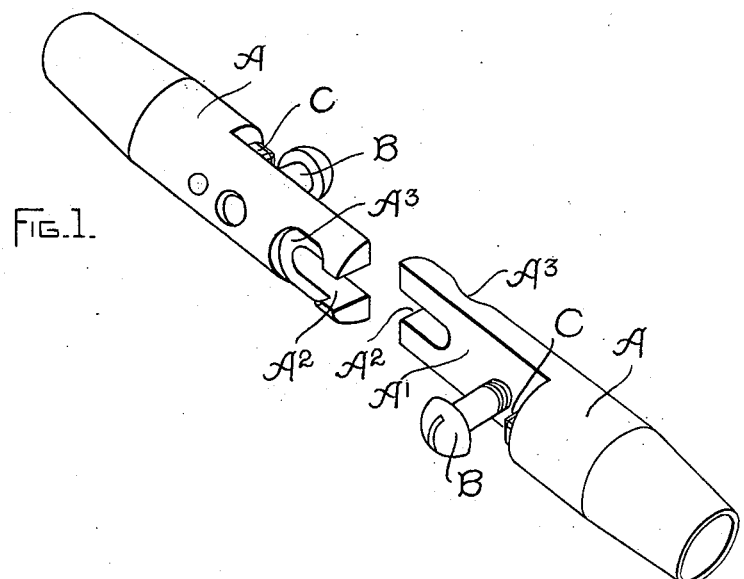
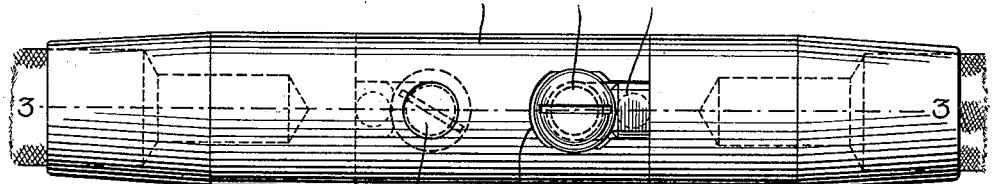
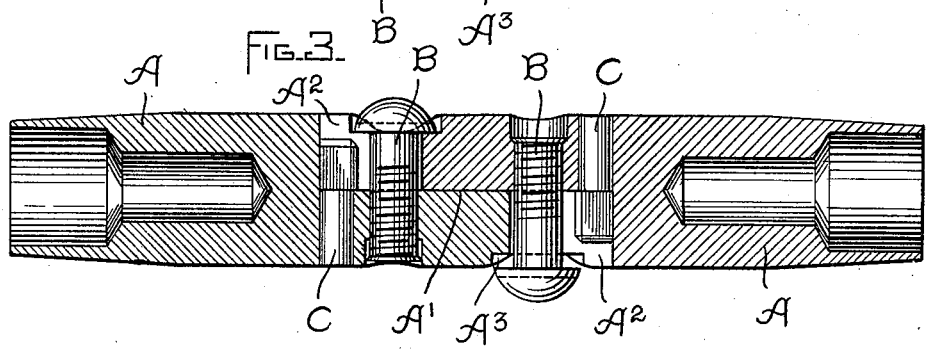
WITNESSES
Edw Williams Jr,
A. F. Macdonald.
INVENTOR
Frank E. Case,
by Albert G. Davis,
Atty.
THE NORRIS PETERS CO., PHOTO-LITHO., WASHINGTON, D. C.

UNITED STATES PATENT OFFICE.

FRANK E. CASE, OF SCHENECTADY, NEW YORK, ASSIGNOR TO THE GENERAL ELECTRIC COMPANY, OF NEW YORK.

CONNECTOR.

SPECIFICATION forming part of Letters Patent No. 613,663, dated November 8, 1898.

Application filed August 5, 1898. Serial No. 687,822. (No model.)

*To all whom it may concern:*

Be it known that I, FRANK E. CASE, a citizen of the United States, residing at Schenectady, county of Schenectady, State of New York, have invented certain new and useful Improvements in Connectors, (Case No. 773,) of which the following is a specification.

My present invention relates to separable couplings for electric conductors by which they may be readily joined or separated, as occasion may require. It has for its object to provide a simple and cheap coupling easily made, readily and securely fastened, and as easily taken apart, in which the parts attached to each cable or conductor are duplicate and interchangeable, so that only one pattern need be kept in stock, and in which ample contact area is provided, so that the resistance of the joint will be inappreciable. Many devices have been made having this object in view, and while they have been to a greater or less extent successful most of them are either insecure or too costly to be commercial.

The accompanying drawings show an embodiment of my invention.

Figure 1 is a perspective of one of the couplings separated so as to show the interchangeable parts as they appear upon the ends of the cable. Fig. 2 is a plan of one of the couplings assembled, and Fig. 3 is a section on the line 3 3 of Fig. 2.

The main feature of the coupling as here represented is the slot in the end of each part registering with a screw fixed in the other part and a depression upon the back of each part of the coupling in which the head of the screw may seat to secure the parts in place. As an additional feature, in order to render it easy to assemble the coupling, a pin is fixed to each part, so that when the two parts of the coupling are put together they form a practically rigid whole.

Referring now to the drawings, A is one part of the coupling, of which the surface A' forms the electrical contact. It will be observed that this may be made of any area desired. At the end is a slot $A^2$, designed to register with a screw B on the other part of the coupling. On the back of the coupling, centered with the end of the slot, is a depression $A^3$, in which the head of the screw seats when the parts are secured in place. On the inner face of the meeting surfaces is a squared pin C, making a working fit with the slot $A^2$ of the other part of the coupling. When the parts are assembled, both of the screws are turned until they clear the top of the other part of the coupling, as shown on the right, for instance, in Fig. 3. The two parts are then brought firmly together, the pin C and the screws forming a guide, so that they are not likely to become laterally displaced. The screws are then turned until the parts are locked close, the head of each screw seating in one of the depressions $A^3$, as shown in Fig. 3.

What I claim as new, and desire to secure by Letters Patent of the United States, is—

1. As a new article of manufacture, a connector for electric conductors, comprising counterpart terminals having slots registering with screws, and depressions in which the screw-heads may rest to secure the parts together.

2. As a new article of manufacture, a connector for electric conductors, consisting of counterpart terminals having contact-surfaces, screws seated in the contact-surfaces, slots in the ends of the parts registering with the screws, and depressions on the outer surfaces in which the screw-heads rest.

3. As a new article of manufacture, a terminal for an electric conductor, having a contact-surface, a screw passing through the contact-surface near one end, a slot at the terminal end, and a depression on the side of the terminal away from the contact-surface, with which the head of the screw in the other terminal may register.

4. As a new article of manufacture, a terminal having a longitudinal slot, a screw and a pin in line with the slot, and a depression in the back of the terminal at the end of the slot.

In witness whereof I have hereunto set my hand this 1st day of August, 1898.

FRANK E. CASE.

Witnesses:
B. B. HULL,
M. U. EMERSON.